United States Patent [19]

Pastrone

[11] Patent Number: 4,552,336
[45] Date of Patent: Nov. 12, 1985

[54] LIQUID FLOW REGULATOR

[75] Inventor: Giovanni Pastrone, Los Gatos, Calif.
[73] Assignee: OXIMETRIX, Inc., Mountain View, Calif.
[21] Appl. No.: 626,266
[22] Filed: Jun. 29, 1984
[51] Int. Cl.[4] .......................... F16K 7/02; F16K 47/04
[52] U.S. Cl. .................................. 251/331; 137/625.3; 251/205; 251/904; 138/46
[58] Field of Search ................. 251/DIG. 5, 331, 121, 251/205; 137/625.3; 138/46

[56] References Cited

U.S. PATENT DOCUMENTS

| | | | |
|---|---|---|---|
| 3,058,431 | 10/1962 | Eddy | 251/331 X |
| 3,851,668 | 12/1974 | Benjamin | 137/625.3 |
| 3,985,336 | 10/1976 | Bentley | 251/205 |
| 4,471,942 | 9/1984 | Kocanowski | 251/DIG. 5 |

FOREIGN PATENT DOCUMENTS 903769 2/1954 Fed. Rep. of Germany ...... 251/331

Primary Examiner—Arnold Rosenthal
Attorney, Agent, or Firm—Robert S. Kelly

[57] ABSTRACT

A liquid flow regulator has a housing formed by two parts that snap together. The housing defines an axial bore, an inlet, an outlet and a plurality of axial grooves opening endwise of the inlet and laterally of the housing into the bore. The grooves taper axially so that the cross-sectional area of each groove gradually decreases from the inlet to nothing at a pont where the groove merges with the bore. The grooves have different axial lengths. An elastomeric sock fits within the bore. Means for expanding the sock radially outward into sealing engagement with the housing adjacent the bore is axially movable within the bore. Flow through the grooves and the bore is regulated by the axial position of the sock expanding means and the minimum cross-sectional area of the tapered, axial grooves at the axial location where the sock seals the bore. Axial adjustment of the sock expanding means sequentially opens and closes passage from the grooves through the bore to the bore outlet. Means are provided for disabling the sock expanding means to limit withdrawal of the sock expanding means from the bore.

5 Claims, 8 Drawing Figures

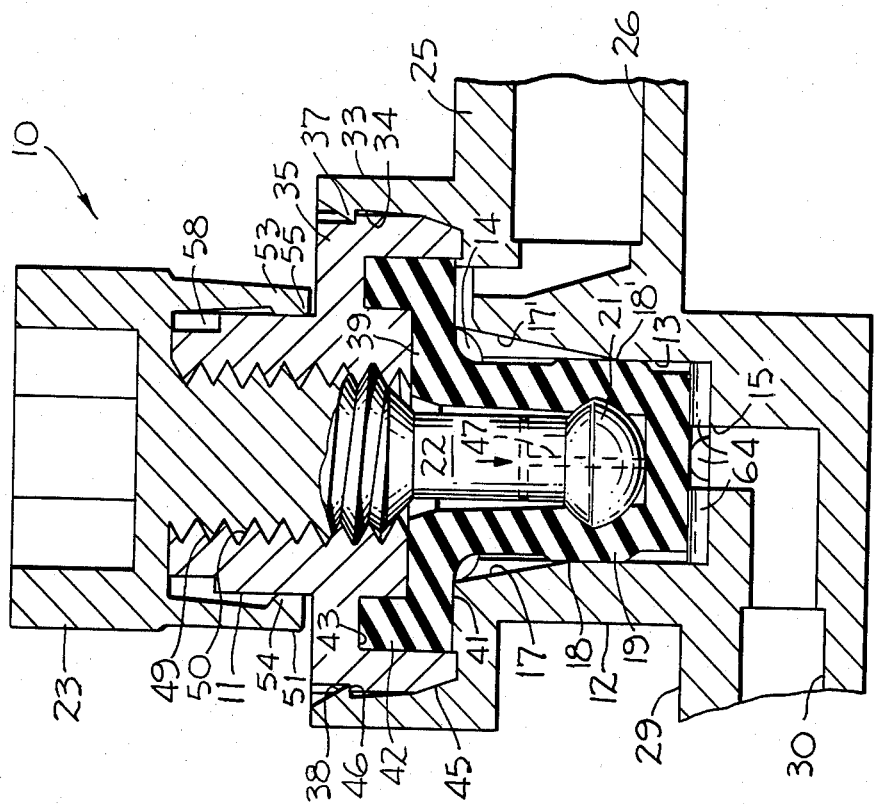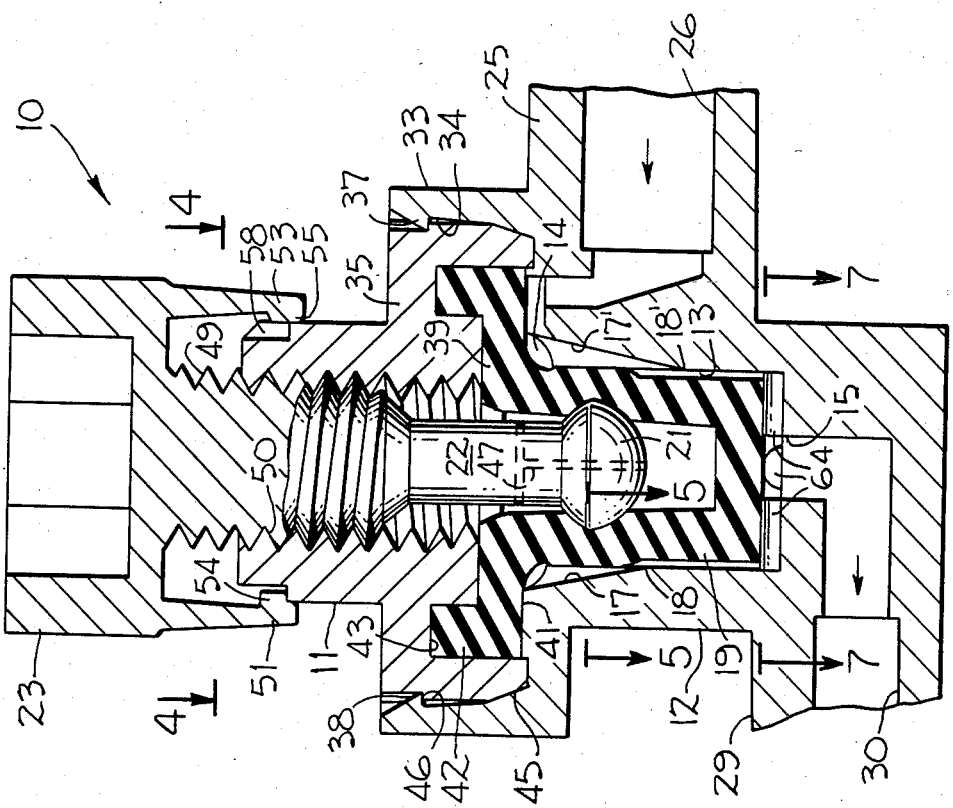

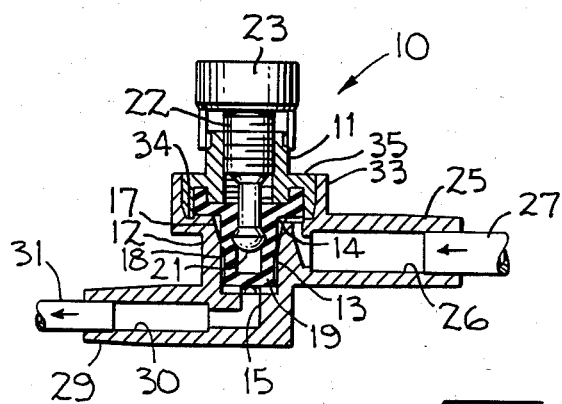
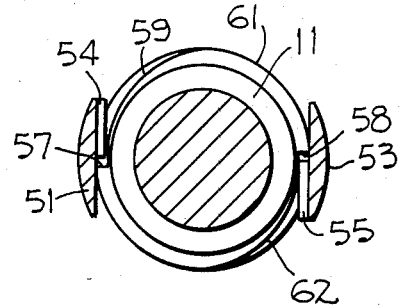
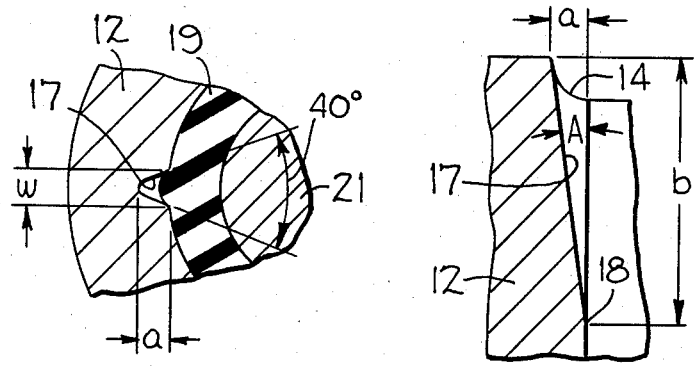
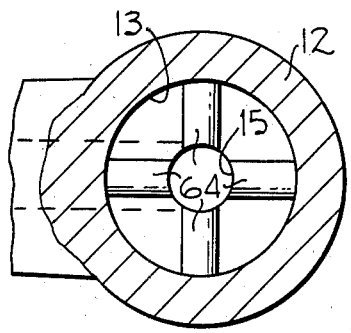
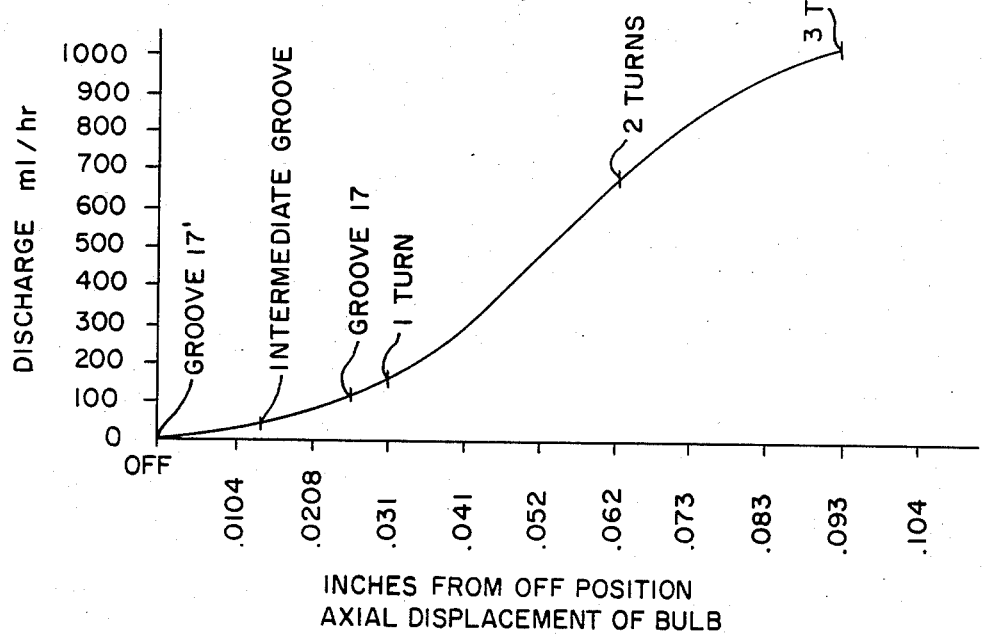

LIQUID FLOW REGULATOR

BACKGROUND OF THE INVENTION

1. Field of the Invention

This invention relates generally to flow control valves. More specifically, it concerns a liquid flow regulator that blocks or controls the flow therethrough at precise discharge rates, suitable for intravenous infusion systems.

2. Description of the Prior Art

Medical treatment may require intravenous infusion of liquids into a patient's blood system for replacing blood, providing food energy, correcting acidity, or introducing drugs. The rate of introduction of the liquid must be carefully controlled for the health of safety of the patient. Pinch clamps acting directly upon a conduit made of plastic tubing have been used to control liquid flow within the conduit. Such clamps have been unreliable and require frequent attention to maintain proper adjustment. Various flow control devices have been developed to provide a more uniform flow rate.

U.S. Pat. No. 3,880,401, issued Apr. 29, 1975 to Harold L. Wiltse, shows a combined flow metering and shut-off valve. Inner and outer valve parts are axilly movable relative to one another to effect relative axial movement of a metering valve plug on one part into and from a metering bore in the other part for regulating and blocking flow through the valve passage. A tapered groove portion on the valve plug forms with the wall of the metering bore a flow passage whose effective cross-sectional flow area increases as the plug retracts and decreases as the plug enters the bore.

U.S. Pat. No. 4,223,813, issued Sept. 23, 1980 to Scott T. Garrett et al., discloses a fluid-flow limiting device having a rigid plastic part and a stretchable elastomeric membrance that together define a metering chamber with an inlet and an outlet. A plastic section fuses to the rigid plastic part and the membrane is enveloped between the part and section. Movable valve members fit through openings in the section to the membrane to stretch it and close off the inlet or the outlet, as appropriate.

U.S. Pat. No. 4,300,552, issued Nov. 17, 1981 to Raymond E. Cannon, shows an intravenous flow control apparatus having a button with V-shaped notches. A flexible diaphragm is positioned above the notches and can be forced against the button and partially into the notches by a pusher rod so as to control the rate at which fluid flows through the notches from an input line to an output line.

Other patents showing flow control devices for intravenous systems include U.S. Pat. No. 2,771,878, issued Nov. 27, 1956 to W. E. Folland et al.; U.S. Pat. No. 3,460,526, issued Aug. 12, 1969 to R. W. McKirdy et al.; U.S. Pat. No. 3,620,500, issued Nov. 16, 1971; and U.S. Pat. No. 3,841,354, issued Oct. 15, 1974 to Roy Edward McDonnell.

SUMMARY OF THE INVENTION

In accordance with the present invention, there is provided a liquid flow regulator having a housing with an axial bore. An inlet is located adjacent one end of the bore, and an outlet is located at the opposite end of the bore. The housing has at least one axial groove opening endwise into the inlet and laterally of the housing into the bore. The groove is tapered from the inlet to the bore so that the groove cross-sectional area gradually decreases to nothing where it merges with the bore. An elastomeric sock fits within the bore. Movable axially of the bore within the sock are means for expanding the sock radially outward into sealing engagement with the housing adjacent the bore. Flow through the groove and the bore is regulated by the axial position of the sock expanding means and the minimum cross-sectional area of the tapered, axial groove at the axial location where the sock seals the bore.

In a preferred embodiment of the invention, the housing has a plurality of axial grooves opening endwise into the inlet and laterally of the housing into the bore. The grooves are tapered from the inlet end to the bore so that the cross-sectional area of each groove gradually decreases to nothing where the groove merges with the bore. The grooves have different axial lengths. Axial adjustment of the sock expanding means sequentially opens and closes passage from the grooves through the bore to the bore outlet.

BRIEF DESCRIPTION OF THE DRAWINGS

FIG. 1 is an axial section, with portion broken away, of a liquid flow regulator embodying the present invention in its open flow chart position.

FIG. 2 is an axial section of the liquid flow regulator similar to FIG. 1 but showing the regulator in its flow shut-off position.

FIG. 3 is a reduced axial section of the liquid flow regulator shown in FIGS. 1 and 2.

FIG. 4 is a reduced horizontal section taken on the line 4—4 of FIG. 1.

FIG. 5 is an enlarged horizontal section taken on the line 5—5 of FIG. 1.

FIG. 6 is an enlarged axial section through one of the tapered grooves of the regulator shown in FIGS. 1, 2 and 3.

FIG. 7 is a horizontal section taken on the line 7—7 of FIG. 1.

FIG. 8 is a diagram of the regulator flow characteristics showing the discharge in relationship to the axial displacement of the bulb from a flow shut-off position.

DESCRIPTION OF THE PREFERRED EMBODIMENT

A liquid flow regulator, indicated generally by reference numeral 10, is shown in FIGS. 1, 2 and 3. The regulator has a housing formed by an upper part 11 and a lower part 12. Within the lower part is an axial bore 13. An inlet 14 is provided adjacent the upper end of the bore and a central outlet 15 is provided at the lower end of the bore. At least one axial groove 17 opens endwise into the inlet and laterally of the housing lower part into the bore. The groove tapers in lateral penetration into the housing so that the groove cross-sectional area gradually decreases to nothing at a point 18 where the groove merges into the bore. An elastomeric sock 19 is fitted within the bore. Mounted for movement axially of the bore and positioned within the sock are sock expanding means that includes a bulb 21 mounted on a stem 22 that threadedly fits through the housing upper part to where a knob 23 is attached for rotating the stem. As the bulb moves axially of the bore, it forces the sock radially outward into sealing engagement with the lower housing part adjacent the bore. Thus, flow through the groove and the bore is regulated by the axial position of the bulb and the minimum or effective cross-sectional area of the tapered axial groove at the location where the sock seals the bore.

With reference to FIG. 3, the housing lower part 12 has a barrel 25 that forms a socket 26 for receiving a supply tubing 27. This tubing is connected to a source, not shown, such as a liquid reservoir located at an elevation that provides a suitable gravitational head above the regulator. A barrel 29 on the housing lower part provides a socket 30 for receiving a discharge tubing 31 that can be intravenous tubing leading to a needle, not shown, for insertion into a patient. A barrel 33 is provided at the top of the housing lower part. This barrel is coaxial with the axial bore 13 and forms a socket 34 for receiving a base portion 35 of the housing upper part 11.

Looking again at FIG. 1 and 2, a lip 37 projects radially from the barrel 33 at the mouth of the socket 34. The lip has a beveled upper surface 38 to facilitate insertion of the base portion 35. The elastomeric sock 19 has a radial portion 39 that extends over the inlet 14 and seats on a base 41 of the socket. Extending axially from the radial portion of the elastomeric sock is an anchor flange 42 that interlocks within a corresponding recess 43 in the bottom of the base portion. A chamfer 45 is provided at the bottom peripheral edge of the base portion to facilitate insertion into the socket, and a radial step 46 is provided on the base portion periphery to interlock with the lip. Upon insertion of the base portion into the socket, the lip is spread outwardly until it can pass over the radial step. At the time the lip and the step snap together, the upper part 11 and the lower part 12 of the housing are interlocked, and the elastomeric sock is locked in place within the bore 13.

A vent 47 extends from the bottom of the bulb 21 to a location laterally on the stem 22 to provide pressure relief when the bulb moves axially downward into the elastomeric sock 19. The stem has external threads 49 and the housing upper part 11 has internal threads 50 that mate for moving the stem axially of the bore upon rotation of the knob 23.

It is desirable to limit withdrawal of the bulb 21 from the axial bore 13 by disabling the rotation of the stem 22. Depending from the knob 23 are a pair of legs 51 and 53. A lug 54 provides laterally from leg 51 towards leg 53. A lug 55 projects laterally from leg 53 towards leg 51. These lugs are offset on opposite sides of a diametrical line between the legs, as shown in FIG. 4. A pair of stops 57 and 58 are located near the top of the housing upper part 11 for engaging the lugs when the stem is rotated counterclockwise. A cam surface 59 extends from the stop 57 to the outer periphery 61 of the housing upper part, and a cam surface 62 extends from the stop 58 to the outer periphery. These cam surfaces force the lugs radially outward upon clockwise rotation of the stem 22. The lugs can travel downward following the outer periphery below the stops. When the lugs are elevated and engage the stops, further counterclockwise rotation is prevented, but the legs can be spread apart to enable further counterclockwise rotation for disassembly of the stem from the housing upper part.

Looking again at FIG. 1, the inlet 14 has an annular shape that encircles the top of the bore 13 and a portion of the elastomeric sock 19. Liquid flows to the inlet from the supply tubing socket 26. The axial groove 17 has a V-shaped cross-section with a central angle of about 40° in the particular embodiment illustrated, as seen in FIG. 5. This groove tapers in both horizontal width (w) and lateral penetration (a) into the housing over the length (b), the base line of the groove making an angle (A) with a vertical line, as shown in FIG. 6, so that the effective cross-sectional area of the groove gradually decreases from the inlet to nothing at point 18 where the groove merges into the bore. While one axial groove is essential, any number of grooves can be used to obtain the desired flow characteristics, and the grooves may be of different shapes or sizes or (as in the case illustrated in FIGS. 1 and 2) they may terminate at different levels. Thus, a second axial groove 17', shown in FIG. 1, tapers to a point 18' where the groove merges into the bore, the point 18' being lower than the point 18 thus making the groove 17' larger than the groove 17 to permit greater flow therethrough. Similarly, a third axial groove, not shown, can be provided which might terminate at some different elevation, e.g., intermediate of 18 and 18'. In the particular embodiment shown, each groove has a lateral penetration (a) (FIG. 5) of 0.025 inches. The grooves have different angles (A) (FIG. 6) with the vertical. Groove 17 has a length (b) of 0.145 inches and forms an angle (A) of 10 degrees. The intermediate groove (not shown) has a length (b) of 0.157 inches and forms an angle (A) of 9 degrees. Groove 17' has a length (b) of 0.170 inches and forms an angle (A) of 8 degrees. Thus, as the bulb 21 is elevated from the shut-off position, as shown in FIG. 2, to the open position, shown in FIG. 1, groove 17', the intermediate groove not shown, and groove 17 would open in sequence. Conversely, when the bulb is lowered from the open position to the shut-off position, groove 17, the intermediate groove not shown, and groove 17' would be closed in sequence.

The elastomeric sock 19 is supported above the bottom of the bore 13 by radial ribs 64, shown in FIG. 1, that project upwardly from the housing part 12 into the bore. As shown in FIG. 7, these ribs extend from the outer periphery of the bore to the central bore outlet 15. Thus liquid can flow between the ribs and under the sock from the bore periphery to the bore outlet.

FIG. 8 shows the flow characteristics of the regulator 10 (with the three flow grooves 17 as previously specified), under an 18 inch gravitational head of liquid pressure, as the bulb 21 is elevated from the off-position shown in FIG. 2. Upon counterclockwise rotation of the knob 23, groove 17' is opened. The flow through the groove increases at the location where the elastomeric sock 19 seals the bore 13. The intermediate groove, not shown, and groove 17 open in sequence upon further elevation of the bulb. The three grooves are opened within one turn (360°) of the knob so that thereafter the discharge rapidly builds up. Upon three turns of the knob, a discharge of 1039 ml/hr is obtained. The slope of the curve indicates that the discharge builds up slowly at first at the low flow rates (where sensitivity of the adjustment mechanism is most important) and more rapidly thereafter. With each rotational movement of the knob, the discharge is adjusted. A conventional drip chamber, not shown, can be provided to determine the number of drops per minute (and thereby the actual flow rate), and the desired flow rate can thus be obtained by adjusting the regulator until the desired rate is observed.

From the foregoing description, it will be seen that the liquid flow regulator 10 has a housing 11, 12 with an axial bore 13. An inlet 14 is located adjacent one end of the bore, and an outlet 15 is located at the opposite end of the bore. The housing has at least one axial groove 17, and preferably, a plurality of grooves 17' opening endwise into the inlet and laterally of the housing into the bore. The grooves taper from the inlet to the bore so that the cross-sectional area of each groove gradually decreases to nothing at the points 18, 18' where the grooves merge with the bore. The grooves have different axial lengths. An elastomeric sock 19 fits within the bore. Means 21, 22 for expanding the sock radially outward into sealing engagement with the housing adjacent the bore are axially movable within the bore. Flow through the grooves and the bore is regulated by the axial position of the sock expanding means and the minimum cross-sectional area of the tapered, axial grooves at the axial location where the sock seals are bore. Axial adjustment of the sock expanding means sequentially opens and closes passage from the grooves through the bore to the bore outlet. The liquid flow regulator 10 includes means 51, 53, 54, 55, 57, 58, 59, 61, 62 for disabling the sock expanding means to limit withdrawal of the bulb 21 from the bore.

Although the best mode contemplated for carrying out the present invention has been herein shown and described, it will be apparent that modification and variation can be made without departing from what is regarded to be the subject matter of the invention.

What is claimed is:

1. A liquid flow regulator comprising:
a housing having an axial bore, an inlet adjacent one end of the bore, an outlet at the opposite end of the bore, and at least one axial groove opening endwise into the inlet and laterally of the bore into the bore, said groove having at least one dimension that tapers from the inlet to the bore so that the groove cross-sectional area gradually decreases to nothing where the groove merges into the bore;
an elastomeric sock fitted within the bore;
means movable axially of the bore within the sock for expanding the sock radially outward into sealing engagement with the housing adjacent the bore, whereby flow through the groove and the bore is regulated by the axial position of the sock expanding means and the minimum cross-sectional area of the tapered, axial groove at the axial location where the sock seals the bore, said sock expanding means including a bulb, a stem attached to the bulb including means threadedly fitting the stem through the housing so as to permit the bulb to be moved axially of the bore upon rotation thereof, and a knob for rotating the stem; and
means for disabling the sock expanding means to limit withdrawal of the bulb from the bore.

2. The liquid flow regulator of claim 1 wherein said means for disabling the sock expanding means includes a pair of legs depending from the knob, a pair of lugs projecting laterally from the legs with one lug on each leg projecting towards the other leg, a pair of stops on the housing near the top portion thereof for engaging the lugs when the stem is rotated in one direction and a pair of cam surfaces on the housing extending from the stops to the outer periphery of the housing for camming the lugs radially outward upon rotation of the stem in the opposite direction.

3. A liquid flow regulator comprising:
a housing having an axial bore, an inlet adjacent one end of the bore, an outlet at the opposite end of the bore, and at least one axial groove opening endwise into the inlet and laterally of the bore into the bore, said groove having at least one dimension that tapers from the inlet to the bore so that the groove cross-sectional area gradually decreases to nothing where the groove merges into the bore;
an elastomeric sock fitted within the bore; and
means movable axially of the bore within the sock for expanding the sock radially outward into sealing engagement with the housing adjacent the bore, whereby flow through the groove and the bore is regulated by the axial position of the sock expanding means and the minimum cross-sectional area of the tapered, axial groove at the axial location where the sock seals the bore, said sock expanding means including a bulb, a stem attached to the bulb including means threadedly fitting the stem through the housing so as to permit the bulb to be moved axially of the bore upon rotation thereof, and a knob for rotating the stem, said bulb and stem having a vent extending from the bottom of the bulb to a location laterally of the stem to provide pressure relief when the bulb moves axially downward into the sock.

4. A liquid flow regulator comprising:
a housing having an axial bore, an inlet adjacent one end of the bore, an outlet at the opposite end of the bore, and at least one axial groove opening endwise into the inlet and laterally of the bore into the bore, said groove having at least one dimension that tapers from the inlet to the bore so that the groove cross-sectional area gradually decreases to nothing where the groove merges into the bore;
an elastomeric sock fitted within the bore;
means movable axially of the bore within the sock for expanding the sock radially outward into sealing engagement with the housing adjacent the bore, whereby flow through the groove and the bore is regulated by the axial position of the sock expanding means and the minimum cross-sectional area of the tapered, axial groove at the axial location where the sock seals the bore; and
said housing being made of two parts that snap together locking the elastomeric sock in place within the bore.

5. A liquid flow regulator comprising:
a housing having an axial bore, an inlet adjacent one end of the bore, an outlet at the opposite end of the bore, and at least one axial groove opening endwise into the inlet and laterally of the bore into the bore, said groove having at least one dimension that tapers from the inlet to the bore so that the groove cross-sectional area gradually decreases to nothing where the groove merges into the bore;
an elastomeric sock fitted within the bore;
means movable axially of the bore within the sock for expanding the sock radially outward into sealing engagement with the housing adjacent the bore, whereby flow through the groove and the bore is regulated by the axial position of the sock expanding means and the minimum cross-sectional area of the tapered, axial groove at the axial location where the sock seals the bore; and
said housing having a plurality of ribs projecting upwardly from the bottom of the bore and extending from the sides of the bore to the bore outlet for supporting the elastomeric sock above the bottom of the bore.

* * * * *